(12) United States Patent
Sawahara (10) Patent No.: US 11,215,960 B2
(45) Date of Patent: Jan. 4, 2022

(54) ENGINEERING APPARATUS, CONTROL METHOD OF ENGINEERING APPARATUS, AND PROGRAM FOR GENERATING EXECUTABLE CODE FOR CONTROLLING TARGET HARDWARE

(71) Applicant: YOKOGAWA ELECTRIC CORPORATION, Tokyo (JP)

(72) Inventor: Hidenori Sawahara, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 2 days.

(21) Appl. No.: 16/669,095

(22) Filed: Oct. 30, 2019

(65) Prior Publication Data

US 2020/0142376 A1 May 7, 2020

(30) Foreign Application Priority Data

Nov. 2, 2018 (JP) .............................. JP2018-207644

(51) Int. Cl.
*G05B 19/042* (2006.01)
*G06F 8/41* (2018.01)
(Continued)

(52) U.S. Cl.
CPC ........... *G05B 19/0426* (2013.01); *G06F 8/41* (2013.01); *G06F 8/51* (2013.01); *G06F 8/54* (2013.01);
(Continued)

(58) Field of Classification Search
CPC .................................................. G06F 8/41–54
(Continued)

(56) References Cited

U.S. PATENT DOCUMENTS 5,142,469 A * 8/1992 Weisenborn ......... G05B 19/056
700/17
6,076,020 A * 6/2000 Schwenke ............ G05B 19/056
700/104
(Continued)

FOREIGN PATENT DOCUMENTS

EP 2169547 A1 3/2010
JP 07-295612 11/1995
(Continued)

OTHER PUBLICATIONS

Wenbin Dai et al. "Modelling Distributed Motion Control Applications using IEC 61499 Function Blocks"; IECON 2019—45th Annual Conference of the IEEE Industrial Electronics Society—Oct. 14-17, 2019.*

*Primary Examiner* — Francisco J Aponte
(74) *Attorney, Agent, or Firm* — Rankin, Hill & Clark LLP (57) ABSTRACT

An engineering apparatus according to the present disclosure generates generating executable code, which causes target hardware to operate, from a control application. The engineering apparatus includes an algorithm converter that converts control logic included in the control application into control logic code, a type management unit that outputs a type definition code corresponding to a data block structure of data held by a function block included in the control application, an instance management unit that outputs a memory allocation code that allocates an instance of the function block to memory, and a build controller that generates the executable code based on the control logic code, the type definition code, and the memory allocation code. Executable code for execution by target hardware is
(Continued)

debugged while the executable code is in the form of a control application before conversion to a high-level language.

7 Claims, 5 Drawing Sheets

(51) Int. Cl.
 *G06F 8/51* (2018.01)
 *G06F 8/54* (2018.01)
 *G06F 9/445* (2018.01)
(52) U.S. Cl.
 CPC .... *G06F 9/445* (2013.01); *G05B 2219/23008* (2013.01); *G05B 2219/23266* (2013.01); *G05B 2219/23403* (2013.01)
(58) Field of Classification Search
 USPC .......................................................... 717/106
 See application file for complete search history.

(56) References Cited

U.S. PATENT DOCUMENTS

| | | | | |
|---|---|---|---|---|
| 7,024,666 B1* | 4/2006 | Brown | ...................... | G06F 8/47 |
| | | | | 700/246 |
| 7,107,586 B2* | 9/2006 | Ishiwata | ............... | G06F 8/4434 |
| | | | | 717/162 |
| 8,327,316 B2* | 12/2012 | Chouinard | .............. | G06F 9/445 |
| | | | | 717/100 |
| 8,352,905 B2* | 1/2013 | Chouinard | ................ | G06F 8/20 |
| | | | | 717/104 |
| 8,943,467 B2* | 1/2015 | Esfahan | .................... | G06F 8/41 |
| | | | | 717/107 |
| 9,069,567 B1* | 6/2015 | Sams | ........................ | G06F 8/41 |
| 9,606,776 B2* | 3/2017 | Osakabe | ................ | G05B 19/05 |
| 9,921,565 B2* | 3/2018 | Ikegami | ................ | G05B 19/056 |
| 10,599,404 B1* | 3/2020 | Neto | ....................... | G06F 8/443 |
| 10,705,500 B2* | 7/2020 | Unno | .................... | G05B 19/056 |
| 10,732,943 B2* | 8/2020 | Sun | ......................... | G06N 3/08 |
| 10,761,884 B2* | 9/2020 | Shimamura | .......... | G05B 19/408 |
| 2006/0080682 A1* | 4/2006 | Anwar | ................ | G06F 9/44547 |
| | | | | 719/331 |
| 2010/0083223 A1 | 4/2010 | Chouinard et al. | | |
| 2010/0083232 A1* | 4/2010 | Chouinard | .............. | G06F 21/10 |
| | | | | 717/124 |
| 2010/0180267 A1* | 7/2010 | Huang | ................. | G05B 19/056 |
| | | | | 717/140 |
| 2010/0192122 A1 | 7/2010 | Esfahan et al. | | |
| 2010/0268358 A1* | 10/2010 | Cantarelli | .............. | G05B 19/05 |
| | | | | 700/86 |
| 2015/0154011 A1 | 6/2015 | Ceng et al. | | |
| 2016/0117158 A1* | 4/2016 | MacCleery | ............ | G05B 17/02 |
| | | | | 717/174 |
| 2018/0032055 A1* | 2/2018 | Janssen | .................... | G06F 8/436 |
| 2020/0142375 A1* | 5/2020 | Sawahara | ................ | G06F 8/54 |

FOREIGN PATENT DOCUMENTS

| | | |
|---|---|---|
| JP | 2002-99312 | 4/2002 |
| JP | 2005-56415 A | 3/2005 |
| JP | 2009-301359 A | 12/2009 |
| JP | 2010-250832 A | 11/2010 |
| JP | 2015-125713 A | 7/2015 |
| WO | 2013/005350 A1 | 1/2013 |
| WO | 2014/064830 A1 | 5/2014 |

* cited by examiner

ENGINEERING APPARATUS, CONTROL METHOD OF ENGINEERING APPARATUS, AND PROGRAM FOR GENERATING EXECUTABLE CODE FOR CONTROLLING TARGET HARDWARE

CROSS-REFERENCE TO RELATED APPLICATION

The present application claims priority to and the benefit of Japanese Patent Application No. 2018-207644 filed Nov. 2, 2018, the entire contents of which are incorporated herein by reference.

TECHNICAL FIELD

The present disclosure relates to an engineering apparatus, a control method of an engineering apparatus, and a program.

BACKGROUND

A control system for controlling the production process and production facilities at a production site or the like has been developed. In recent years, control systems create added value at the production site in many ways through various processes, such as predictive maintenance based on data collection and analysis, real-time control at the sensor/actuator level, and the like.

To perform these processes, control systems have come to include a variety of devices, such as a distributed control system (DCS), a programmable logic controller (PLC), a general-purpose personal computer, a gateway with a computing function, an intelligent sensor/actuator, a cloud computer, a fog computer, and the like.

The devices targeted for control (target hardware) in the control system are controlled by a control application.

The control application is normally created using an editor in a development environment corresponding to the target hardware that is to be controlled. The editor supports a programming language for developing the control application. Examples include a ladder editor, a flowchart editor, and a script editor.

The control application is normally converted with a compiler or the like into executable code that can be directly executed by a processor of the target hardware. The executable code is stored in a memory inside the target hardware. The compiler may be included in the development environment or on the target hardware. The target hardware uses a processor to interpret and execute the executable code stored in the memory.

The development environment for creating the control application is specialized for the target hardware that is to be controlled, and the development environment often differs for each piece of target hardware. When the development environment is device dependent in this way, the operator needs to be proficient in a variety of development environments. This may reduce the engineering efficiency.

To address such device dependency of the development environment, the user program of the application needs to be made executable without dependence on the device, and an equivalent debugging function needs to be provided for applications written in a plurality of description languages. Patent literature (PTL) 1 discloses one method of addressing device dependency of the user program. This method converts a device-dependent sequence instruction program (control application) into a program written in a general-purpose high-level language. PTL 2 discloses a method of dividing a device-dependent sequence instruction program (control application) into a plurality of blocks and converting, block by block, into a program written in a general-purpose high-level language. In both PTL 1 and PTL 2, the program written in a high-level language is compiled on the development environment to generate executable code. The target hardware receives and executes the executable code.

CITATION LIST

Patent Literature

PTL 1: JPH7-295612A
PTL 2: JP2002-99312A

SUMMARY

An engineering apparatus according to an embodiment is an engineering apparatus for generating executable code from a control application, created in a first programming language, for controlling target hardware. The executable code causes the target hardware to operate. The engineering apparatus includes an algorithm converter configured to convert control logic included in the control application into control logic code expressed in a second programming language; a type management unit configured to express a type definition code in the second programming language and output the type definition code, the type definition code corresponding to a data block structure of data held by a function block included in the control application; an instance management unit configured to express a memory allocation code in the second programming language and output the memory allocation code, the memory allocation code allocating an instance of the function block included in the control application to memory in the target hardware; and a build controller configured to use at least one of a compiler or a linker for the target hardware to generate the executable code based on the control logic code, the type definition code, and the memory allocation code.

A control method according to an embodiment is a control method of an engineering apparatus for generating executable code from a control application, created in a first programming language, for controlling target hardware, the executable code causing the target hardware to operate. The control method includes converting control logic included in the control application into control logic code expressed in a second programming language; expressing a type definition code in the second programming language and outputting the type definition code, the type definition code corresponding to a data block structure of data held by a function block included in the control application; expressing a memory allocation code in the second programming language and outputting the memory allocation code, the memory allocation code allocating an instance of the function block included in the control application to memory in the target hardware; and using at least one of a compiler or a linker for the target hardware to generate the executable code based on the control logic code, the type definition code, and the memory allocation code.

A program according to an embodiment is a program to control an engineering apparatus for generating executable code from a control application, created in a first programming language, for controlling target hardware, the executable code causing the target hardware to operate. The program causes the engineering apparatus to convert control logic included in the control application into control logic code expressed in a second programming language; express a type definition code in the second programming language and output the type definition code, the type definition code corresponding to a data block structure of data held by a function block included in the control application; express a memory allocation code in the second programming language and output the memory allocation code, the memory allocation code allocating an instance of the function block included in the control application to memory in the target hardware; and use at least one of a compiler or a linker for the target hardware to generate the executable code based on the control logic code, the type definition code, and the memory allocation code.

DETAILED DESCRIPTION

PTL 1 and PTL 2 have the problem that the executable code for execution by the target hardware cannot be debugged while the executable code is still in the form of the control application, before conversion to the high-level language.

The present disclosure aims to provide an engineering apparatus, a control method of an engineering apparatus, and a program that allow executable code for execution by target hardware to be debugged while the executable code is in the form of a control application before conversion to a high-level language.

An engineering apparatus according to an embodiment is an engineering apparatus for generating executable code from a control application, created in a first programming language, for controlling target hardware. The executable code causes the target hardware to operate. The engineering apparatus includes an algorithm converter configured to convert control logic included in the control application into control logic code expressed in a second programming language; a type management unit configured to express a type definition code in the second programming language and output the type definition code, the type definition code corresponding to a data block structure of data held by a function block included in the control application; an instance management unit configured to express a memory allocation code in the second programming language and output the memory allocation code, the memory allocation code allocating an instance of the function block included in the control application to memory in the target hardware; and a build controller configured to use a compiler/linker for the target hardware to generate the executable code based on the control logic code, the type definition code, and the memory allocation code. This engineering apparatus allows executable code for execution by target hardware to be debugged while the executable code is in the form of a control application before conversion to a high-level language (second programming language). In greater detail, the engineering apparatus separates the control logic and data from the control application created with the first programming language and manages the control logic and data. Hence, to debug the executable code generated from the control logic code, the type definition code, and the memory allocation code that are expressed in the second programming language, the control application before conversion to the second programming language can be debugged.

In an engineering apparatus according to an embodiment, the build controller may select the compiler/linker for the target hardware from among a plurality of compiler/linkers. The engineering apparatus can generate executable code corresponding to various types of target hardware by the build controller thus selecting the compiler/linker for the target hardware from among a plurality of compiler/linkers.

An engineering apparatus according to an embodiment may further include a symbol analyzer configured to extract member information and size information of the data block structure from the executable code. Offset positions in the data block can be acquired by the symbol analyzer thus extracting the member information and size information of the data block structure.

An engineering apparatus according to an embodiment may further include an instance/type list database configured to store the data block structure, and the symbol analyzer may be configured to provide the member information and the size information to the data block structure stored in the instance/type list database. Offset positions in the data block can be acquired by the symbol analyzer thus providing the member information and size information.

In an engineering apparatus according to an embodiment, the build controller may, when generating the executable code, be configured to use the compiler/linker to link a communication service program, a control service program, and a library that are precompiled for the target hardware. The communication service program may be configured to transmit and receive information to and from the engineering apparatus when the executable code is executed on the target hardware. The control service program may be configured to schedule execution of the executable code when the executable code is executed on the target hardware. By the communication service program, control service program, and library that are precompiled for the target hardware being linked in this way to generate the executable code, existing target hardware can also be caused to execute executable code that is transmitted afterwards.

In the engineering apparatus according to an embodiment, a communication service with a loading function may be implemented on the target hardware. The target hardware can download the executable code when the communication service with a loading function is implemented on the target hardware in this way.

A control method according to an embodiment is a control method of an engineering apparatus for generating executable code from a control application, created in a first programming language, for controlling target hardware, the executable code causing the target hardware to operate. The control method includes converting control logic included in the control application into control logic code expressed in a second programming language; expressing a type definition code in the second programming language and outputting the type definition code, the type definition code corresponding to a data block structure of data held by a function block included in the control application; expressing a memory allocation code in the second programming language and outputting the memory allocation code, the memory allocation code allocating an instance of the function block included in the control application to memory in the target hardware; and using a compiler/linker for the target hardware to generate the executable code based on the control logic code, the type definition code, and the memory allocation code. This control method of an engineering apparatus allows executable code for execution by target hardware to be debugged while the executable code is in the form of a control application before conversion to a high-level language (second programming language).

A program according to an embodiment is a program to control an engineering apparatus for generating executable code from a control application, created in a first programming language, for controlling target hardware, the executable code causing the target hardware to operate. The program causes the engineering apparatus to convert control logic included in the control application into control logic code expressed in a second programming language; express a type definition code in the second programming language and output the type definition code, the type definition code corresponding to a data block structure of data held by a function block included in the control application; express a memory allocation code in the second programming language and output the memory allocation code, the memory allocation code allocating an instance of the function block included in the control application to memory in the target hardware; and use a compiler/linker for the target hardware to generate the executable code based on the control logic code, the type definition code, and the memory allocation code. This program allows executable code for execution by target hardware to be debugged while the executable code is in the form of a control application before conversion to a high-level language (second programming language).

The present disclosure provides an engineering apparatus, a control method of an engineering apparatus, and a program that allow executable code for execution by target hardware to be debugged while the executable code is in the form of a control application before conversion to a high-level language.

Embodiments of the present disclosure are described below with reference to the drawings.

Figure 1:
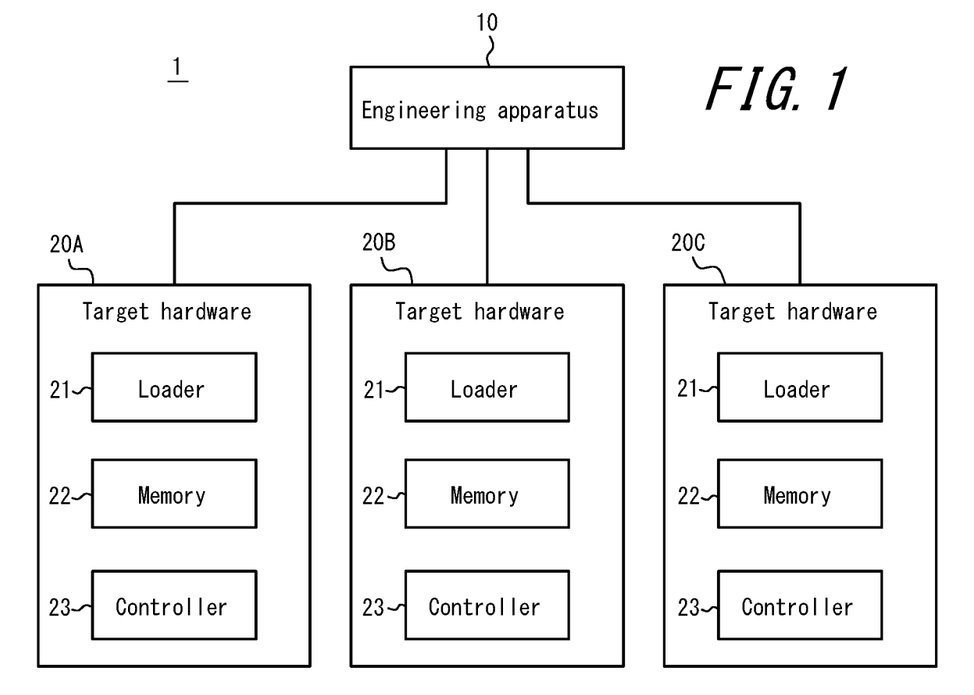
FIG. 1 illustrates an example configuration of a control system that includes an engineering apparatus according to an embodiment.

FIG. 1 illustrates an example configuration of a control system 1 that includes an engineering apparatus 10 according to an embodiment. The control system 1 includes an engineering apparatus 10, target hardware 20A, target hardware 20B, and target hardware 20C. Three pieces of target hardware 20A to 20C are depicted in FIG. 1, but any number, one or more, of pieces of target hardware may be included. Subsequently, the target hardware 20A to 20C is collectively referred to as target hardware 20 when no distinction needs to be made.

The engineering apparatus 10 generates executable code directly executable by the target hardware 20 from a control application, created in a first programming language, for controlling the target hardware 20.

The first programming language may be any appropriate language, such as a graphical user interface (GUI) based programming language, a text-based programming language, or a script-based programming language. The first programming language is preferably one of the programming languages defined by IEC 61131-3, which is a PLC standard. IEC 61131-3 defines programming languages such as ladder diagram, function block diagram, structured text, instruction list, and sequential function chart.

The target hardware 20 is a device controlled by the executable code generated by the engineering apparatus 10. The target hardware 20 regularly executes the executable code, which is downloaded from the engineering apparatus 10, as a task or thread. The target hardware 20 may execute the executable code on an event-driven basis.

The target hardware 20 may be a variety of devices that have a general-purpose computing function. Examples of the target hardware 20 include PLC, DCS, a temperature controller, a recorder, supervisory control and data acquisition (SCADA), and virtual DCS/PLC.

As illustrated in FIG. 1, the target hardware 20 includes a loader 21, a memory 22, and a controller 23.

The loader 21 downloads the executable code generated by the engineering apparatus 10 from the engineering apparatus 10 and stores the downloaded executable code in the memory 22.

The memory 22 may include any storage apparatus, such as a hard disk drive (HDD), a solid state drive (SSD), an electrically erasable programmable read-only memory (EEPROM), a read-only memory (ROM), a random access memory (RAM), or the like. The memory 22 may, for example, function as a main storage apparatus, an auxiliary memory apparatus, or a cache memory. The memory 22 is not limited to being internal to the target hardware 20 and may be an external storage apparatus connected through a digital input/output port or the like, such as a universal serial bus (USB).

The memory 22 stores the executable code downloaded from the engineering apparatus 10 by the loader 21.

The controller 23 controls each component of the target hardware 20. The controller 23 may be configured as a processor, such as a central processing unit (CPU).

The controller 23 interprets the executable code stored in the memory 22 and executes the various processes.

A communication service with the loading function may be implemented on the target hardware 20. The target hardware 20 can download the executable code generated by the engineering apparatus 10 from the engineering apparatus 10 using the loading function.

Figure 2:
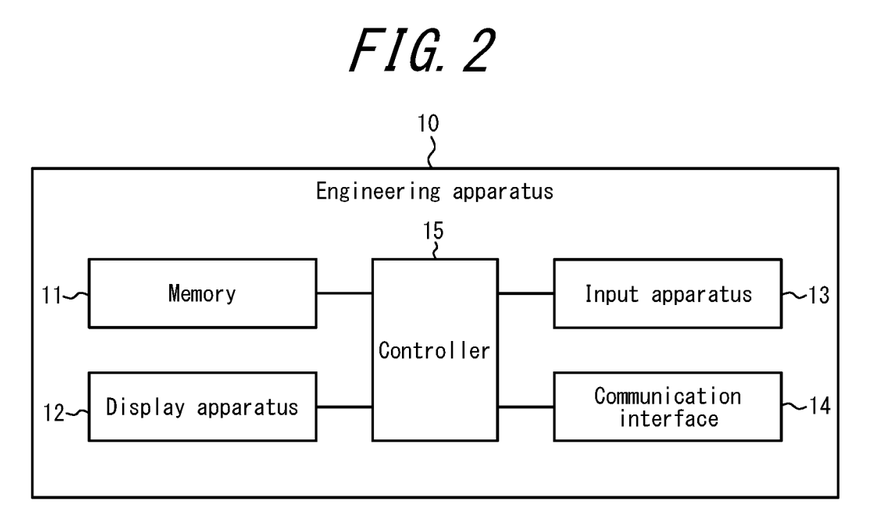
FIG. 2 illustrates an example hardware configuration of an engineering apparatus according to an embodiment.

FIG. 2 illustrates an example hardware configuration of the engineering apparatus 10 according to an embodiment.

The engineering apparatus 10 includes a memory 11, a display apparatus 12, an input apparatus 13, a communication interface 14, and a controller 15. The engineering apparatus 10 may, for example, be a server, a general-purpose computer such as a desktop PC, a factory computer, an apparatus such as a PLC, a laptop computer, a tablet, or the like.

The memory 11 may include any storage apparatus, such as an HDD, SSD, EEPROM, ROM, RAM, or the like. The memory 11 may, for example, function as a main storage apparatus, an auxiliary memory apparatus, or a cache memory. The memory 11 is not limited to being internal to the engineering apparatus 10 and may be an external storage apparatus connected through a digital input/output port or the like, such as USB. The memory 11 stores various information and programs necessary for operation of the engineering apparatus 10.

The display apparatus 12 displays various information. The display apparatus 12 may, for example, be a liquid crystal display. The display apparatus 12 may be implemented in various forms, such as a head-mounted display, a glasses-mounted display, or a watch-mounted display.

The input apparatus 13 receives input from the user to the engineering apparatus 10. The input apparatus 13 is, for example, a keyboard and/or a mouse. The input apparatus 13 may be a microphone for inputting audio information, a camera for inputting image information, or the like. The input apparatus 13 may be a touch panel. In this case, the input apparatus 13 may also function as the display apparatus 12.

The communication interface 14 communicates with the target hardware 20 of FIG. 1 by wired or wireless communication.

The controller 15 controls each component of the engineering apparatus 10. The controller 15 may, for example, be configured by a processor such as a CPU. The programs executed by the processor may, for example, be stored in a memory included in the controller 15 or may be stored in the memory 11.

Figure 3:
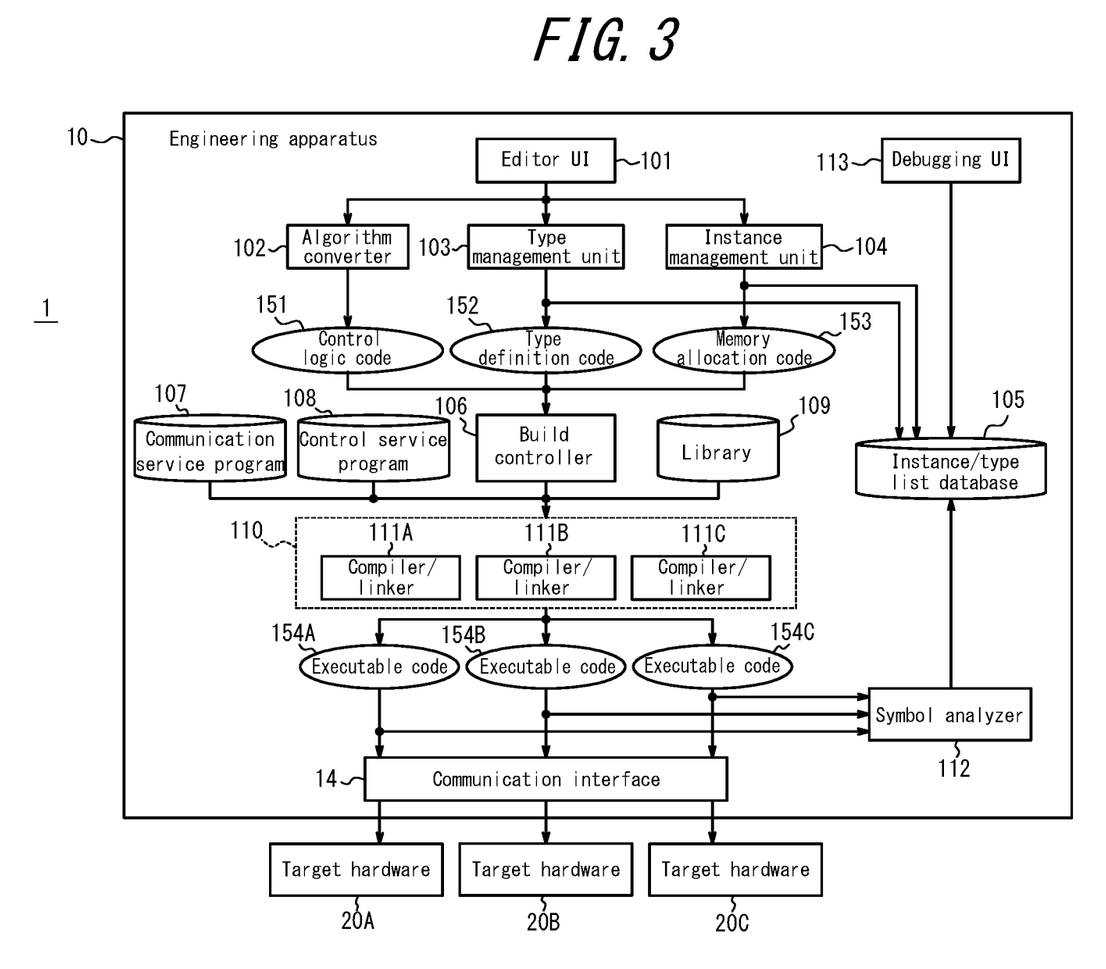
FIG. 3 illustrates operations of an engineering apparatus according to an embodiment.

Next, operations of the engineering apparatus 10 are described with reference to the control system 1 illustrated in FIG. 3. The control system 1 illustrated in FIG. 3 corresponds to the control system 1 illustrated in FIG. 1. In FIG. 3, the inside of the engineering apparatus 10 is represented in functional terms.

The engineering apparatus 10 includes the following function blocks: an editor user interface (UI) 101, an algorithm converter 102, a type management unit 103, an instance management unit 104, a build controller 106, a symbol analyzer 112, and a debugging UI 113. The functions of the editor UI 101, algorithm converter 102, type management unit 103, instance management unit 104, build controller 106, symbol analyzer 112, and debugging UI 113 may be executed by the controller 15 and the like illustrated in FIG. 2.

As data storable in the memory 11 illustrated in FIG. 2, the engineering apparatus 10 includes an instance/type list database (DB) 105, a communication service program 107, a control service program 108, a library 109, and a compiler/linker group 110.

The editor UI 101 is a language editor for developing a control application for controlling the target hardware 20. The editor UI 101 allows the control application to be created in the above-described first programming language.

The algorithm converter 102 converts the control logic included in the control application created with the editor UI 101 into control logic code 151 expressed in a second programming language. The second programming language may be any programming language, such as a general-purpose high-level language. The second programming language may, for example, be C, C++, or the like.

The type management unit 103 stores and manages data, held by the function blocks included in the control application created with the editor UI 101, in the instance/type list DB 105 by data block. The type management unit 103 expresses a type definition code 152, corresponding to the data block structure of the data held by the function blocks included in the control application, in the second programming language and outputs the type definition code 152.

The instance management unit 104 stores and manages a list of function block instances, included in the control application created with the editor UI 101, in the instance/type list DB 105. The instance management unit 104 outputs a memory allocation code 153 expressed in the second programming language. The memory allocation code 153 indicates the actual position when allocating a function block instance included in the control application to the memory 22 of the target hardware 20.

The build controller 106 compiles the control logic code 151, the type definition code 152, and the memory allocation code 153 expressed in the second programming language to generate executable code 154 (any of the executable code 154A to 154C) corresponding to the target hardware 20.

The executable code 154A is directly executable by the target hardware 20A. The executable code 154B is directly executable by the target hardware 20B. The executable code 154C is directly executable by the target hardware 20C. Subsequently, the executable code 154A to 154C is collectively referred to as executable code 154 when no distinction needs to be made.

The compiler/linker group 110 stores a plurality of compiler/linkers 111A to 111C. In the example in FIG. 3, the compiler/linker group 110 stores three compiler/linkers 111A to 111C. The number of compiler/linkers stored by the compiler/linker group 110 may, however, be any number one or greater. Subsequently, the compiler/linkers 111A to 111C are collectively referred to as the compiler/linker 111 when no distinction needs to be made.

The compiler/linker 111 may be a general-purpose compiler/linker. The compiler/linker 111A is a general-purpose compiler/linker for the target hardware 20A. The compiler/linker 111B is a general-purpose compiler/linker for the target hardware 20B. The compiler/linker 111C is a general-purpose compiler/linker for the target hardware 20C.

When the control logic code 151, type definition code 152, and memory allocation code 153 are to be compiled, the build controller 106 selects a compiler/linker 111 corresponding to the applicable target hardware 20 from among the plurality of compiler/linkers 111A to 111C stored in the compiler/linker group 110 and compiles the code.

For example, to generate the executable code 154A for the target hardware 20A, the build controller 106 uses the compiler/linker 111A to compile the control logic code 151, type definition code 152, and memory allocation code 153.

Since the build controller 106 thus selects the compiler/linker 111 corresponding to the target hardware 20 from among the plurality of compiler/linkers 111A to 111C, the engineering apparatus 10 can generate executable code corresponding to various types of target hardware 20.

When using the compiler/linker 111 to compile the control logic code 151, type definition code 152, and memory allocation code 153, the build controller 106 links the communication service program 107, the control service program 108, and the library 109.

The communication service program 107, control service program 108, and library 109 are precompiled for the applicable target hardware 20. The communication service program 107, control service program 108, and library 109 may be installed on the target hardware 20 in advance as firmware of the target hardware 20.

The communication service program 107 is a program for the target hardware 20 to transmit and receive information to and from the engineering apparatus 10 when the executable code 154 is executed on the target hardware 20.

The control service program 108 is a program for scheduling execution of the executable code 154 by the target hardware 20 when the executable code 154 is executed on the target hardware 20.

The library 109 includes various libraries prepared in advance.

The build controller 106 thus uses the selected compiler/linker 111 to compile the control logic code 151, type definition code 152, and memory allocation code 153 and link the communication service program 107, control service program 108, and library 109, thereby generating the executable code 154. The build controller 106 may execute a static link to link the communication service program 107, control service program 108, and library 109 in the engineering apparatus 10 or may execute a dynamic link to link the communication service program 107, control service program 108, and library 109 installed in advance on the target hardware 20.

By the communication service program 107, control service program 108, and library 109 being linked in this way to generate the executable code 154, the engineering apparatus 10 can cause existing target hardware 20 in the control system 1 to execute executable code 154 transmitted afterwards.

Furthermore, by the communication service program 107, control service program 108, and library 109 being linked to generate the executable code 154, the engineering apparatus 10 can update the target hardware 20 by causing the target hardware 20 to execute updated executable code 154, without needing to update the firmware of the target hardware 20. The engineering apparatus 10 can also subsequently add an additional function, such as a user customized function, to existing target hardware 20.

The symbol analyzer 112 extracts member information and size information of the data block structure stored in the instance/type list DB 105 from the executable code 154. The symbol analyzer 112 provides the extracted member information and size information to the data block structure stored in the instance/type list DB 105.

The communication interface 14 corresponds to the communication interface 14 in FIG. 2. The executable code 154 is downloaded onto the target hardware 20 via the communication interface 14. The communication service program 107 included in the executable code 154 downloaded onto the target hardware 20 can communicate with the engineering apparatus 10 via the communication interface 14. The communication service program 107 can, for example, communicate with the engineering apparatus 10 for debugging.

The debugging UI 113 refers to the instance/type list DB 105 to identify the address position, in the memory 22 of the target hardware 20, of a data block managed by the instance/type list DB 105.

The debugging UI 113 can communicate with the communication service program 107, included in the executable code 154 downloaded onto the target hardware 20, to monitor the data at the identified address position. The debugging UI 113 can monitor the data at the identified address position on each of the pieces of target hardware 20A to 20C. The debugging UI 113 can also communicate with the communication service program 107, included in the executable code 154 downloaded onto the target hardware 20, to change the data at the identified address position. The debugging UI 113 can change the data at the identified address position on each of the pieces of target hardware 20A to 20C.

FIG. 3 illustrates the debugging UI 113 as a function block independent from the editor UI 101, but the editor UI 101 may also function as the debugging UI 113.

Next, operations of the engineering apparatus 10 are described in greater detail with concrete examples.

A control application created using the editor UI 101 is created in units of function blocks or the like for each function. The control application is configured overall by the combination of the function blocks. The function blocks include data, such as local variables, input/output variables, and the like, and control programs.

The overall control application operates by the function blocks combined in this way being executed on the target hardware 20.

The engineering apparatus 10 separates and manages control algorithms included in the function blocks and data used by the control algorithms.

Management of the data that the engineering apparatus 10 uses with the control algorithms is described with reference to FIG. 4.

Figure 4:
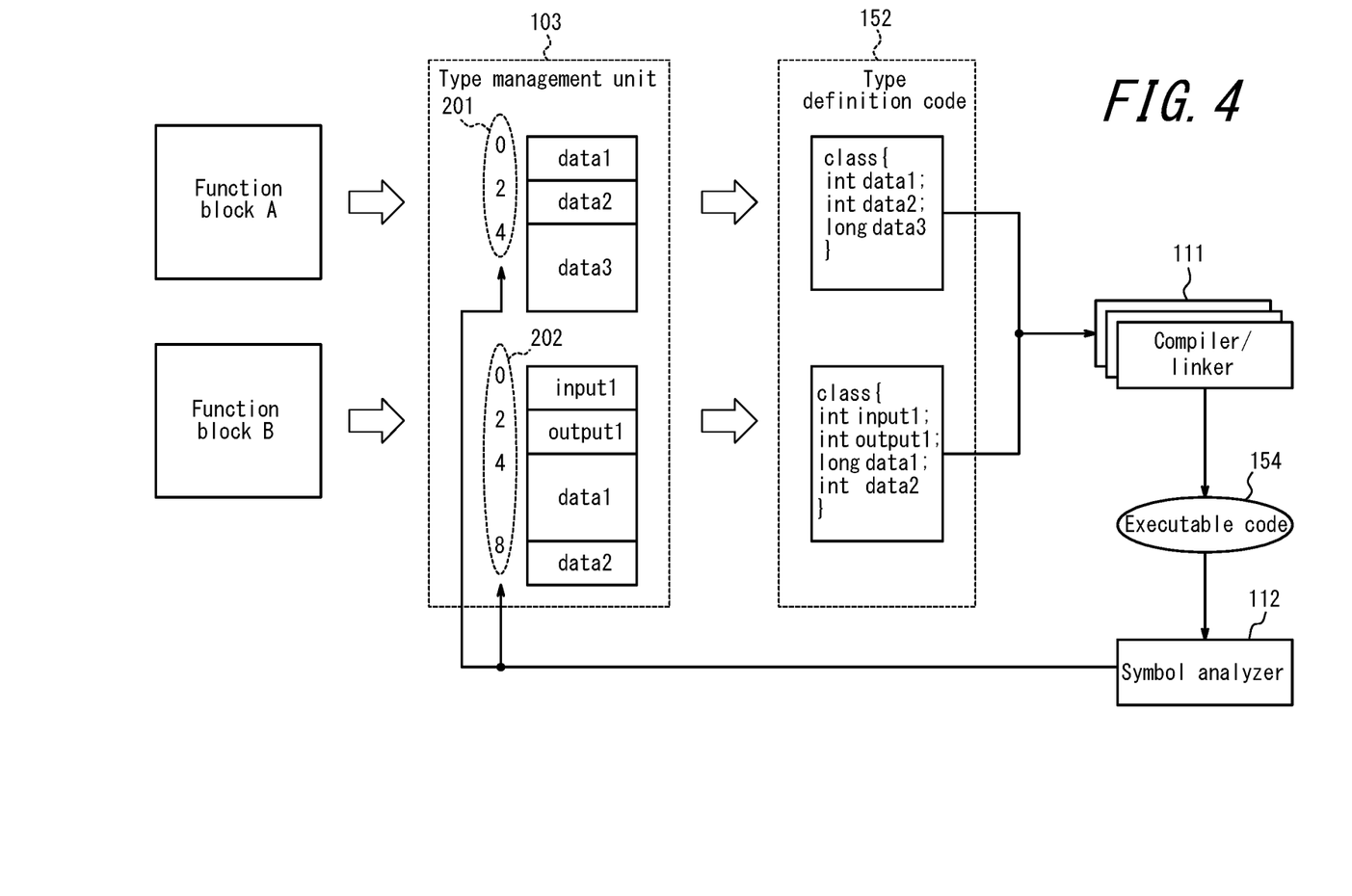
FIG. 4 illustrates example operations of the type management unit and the like of FIG. 3.

Two function blocks are included in the control application in the example in FIG. 4: function block A and function block B.

The type management unit 103 analyzes function block A and function block B and extracts data used in function block A and function block B. In the example in FIG. 4, the type management unit 103 extracts three pieces of data from function block A, "data 1", "data 2", and "data 3". The type management unit 103 extracts four pieces of data from function block B, "input 1", "output 1", "data 1", and "data 2".

The type management unit 103 does not determine the size necessary on the target for each data type at the stage when the data is extracted from function block A and function block B. This is because each piece of data might have a complicated type, such as a structure. Another reason is that data even of the same type may have a different size, depending on the architecture of the target hardware 20.

The type management unit 103 expresses the type definition code 152 corresponding to the extracted data block structure in the second programming language. The type definition code 152 may be expressed as a structural data structure. The structural data structure may, for example, be a class, struct, or the like.

The type definition code 152 is compiled with the compiler/linker 111 corresponding to the target hardware 20, thereby generating the executable code 154.

From the executable code 154, the symbol analyzer 112 extracts the size and offset positions of the members having the types of the type definition code 152.

The symbol analyzer 112 provides the extracted information to the data block structure managed by the type management unit 103 and stored in the instance/type list DB 105. FIG. 4 illustrates offset positions 201 provided to the data (data1, data2, data3) extracted from function block A. FIG. 4 also illustrates offset positions 202 provided to the data (input1, output 1, data1, data2) extracted from function block B.

As a result of information such as the offset position extracted by the symbol analyzer 112 thus being provided to the data block structure stored in the instance/type list DB 105, the engineering apparatus 10 can acquire the offset position of each piece of data in the data block.

Next, instance management by which the engineering apparatus 10 allocates the data blocks corresponding to the function blocks to the memory 22 of the target hardware 20 is described with reference to FIG. 5.

Figure 5:
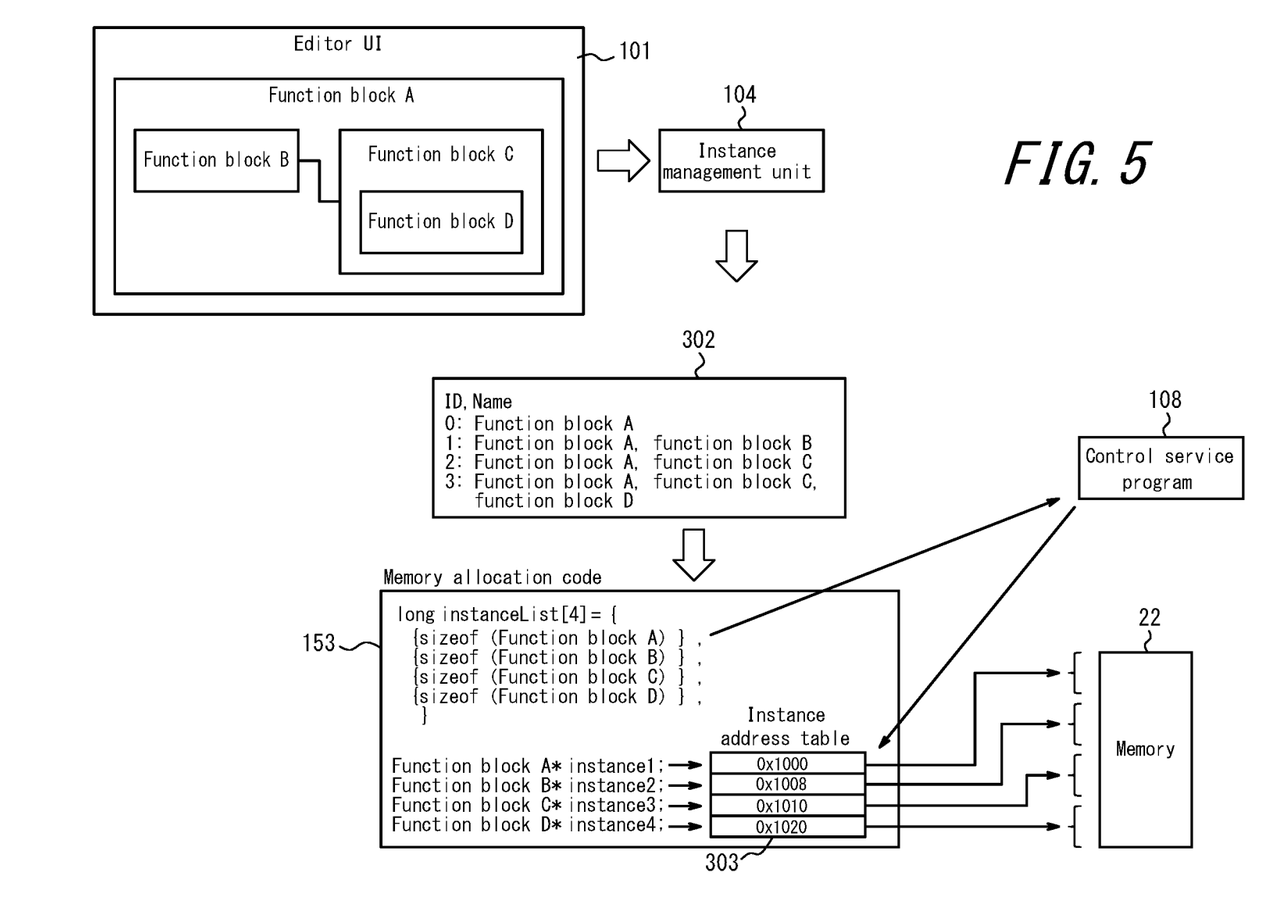
FIG. 5 illustrates example operations of the instance management unit and the like of FIG. 3.

In the example in FIG. 5, the control application created by the editor UI 101 includes four function blocks, i.e. function blocks A to D.

The instance management unit 104 analyzes the call stack of the function blocks included in the control application created by the editor UI 101 to create list data 302 of function block instances.

At this point, the size of each function block instance is undetermined. The instance management unit 104 therefore does not map the function block instances to the memory 22 of the target hardware 20.

Instead of mapping the function block instances, the instance management unit 104 outputs an instance list as the memory allocation code 153. The instance list is list information, corresponding to each function block instance ID, of the size of each function block instance determined after compilation. The memory allocation code 153 outputted by the instance management unit 104 includes a pointer to an instance address table 303.

The actual addresses of the functional block instances in the memory 22 of the target hardware 20 need to be stored in the instance address table 303. The process to store the addresses of the function block instances in the instance address table 303 is executed by the control service program 108 downloaded onto the target hardware 20.

When execution of the executable code 154 on the target hardware 20 begins, the control service program 108 refers to the instance list included in the memory allocation code 153 and sets aside a memory area corresponding in size to each function block instance in the memory 22.

The control service program 108 stores the address of the memory area set aside in the memory 22 for each function block instance in the instance address table 303.

The debugging UI 113 illustrated in FIG. 3 transmits the ID of the function block instance to which the data to be debugged belongs and the offset position from the top address of the function block instance via the communication interface 14 to the communication service program 107 downloaded onto the target hardware 20.

The communication service program 107 refers to the memory 22 to access the data within the function block instance corresponding to the received ID.

In this way, the debugging UI 113 of the engineering apparatus 10 can achieve a debugging function, such as data monitoring or changing of data values, for a specific function block instance.

The engineering apparatus 10 according to the above embodiment allows executable code for execution by the target hardware 20 to be debugged while the executable code is in the form of the control application before conversion to a high-level language (second programming language). The engineering apparatus 10 specifically operates as follows. The algorithm converter 102 converts the control logic included in a control application created in a first programming language into control logic code expressed in a second programming language. The type management unit 103 expresses a type definition code, corresponding to the data block structure of data held by function blocks included in the control application, in the second programming language and outputs the type definition code. The instance management unit 104 expresses a memory allocation code, which allocates an instance of the function block included in the control application to memory in the target hardware 20, in the second programming language and outputs the memory allocation code. The build controller 106 then uses the compiler/linker 111 for the target hardware 20 to generate the executable code based on the control logic code, the type definition code, and the memory allocation code. In this way, the engineering apparatus 10 separates the control logic and data from the control application created with the first programming language and manages the control logic and data. Hence, to debug the executable code generated from the control logic code, the type definition code, and the memory allocation code that are expressed in the second programming language, the control application before conversion to the second programming language can be debugged.

It will be clear to a person of ordinary skill in the art that the present disclosure may be implemented in certain ways other than the above embodiments without departing from the spirit or essential features thereof. Accordingly, the above explanation merely provides examples that are in no way limiting. The scope of the present disclosure is to be defined by the appended claims, not by the above explanation. Among all changes, various changes that are within the range of equivalents are considered to be included therein.

For example, the arrangement, number, and the like of the above-described components are not limited to the above explanation or the drawings. The arrangement, number, and the like of each component may be selected freely as long as the functions of the component can be achieved.

Furthermore, while the present disclosure has been described focusing on apparatuses, the present disclosure may also be embodied as a method including steps executed by the components of an apparatus, as a method executed by a processor provided in an apparatus, as a program, or as a recording medium on which a program is recorded. Such embodiments are also to be understood as included in the scope of the present disclosure.

The invention claimed is:

1. An engineering apparatus for generating executable code from a control application, created in a first programming language, for controlling target hardware, the executable code causing the target hardware to operate, the engineering apparatus comprising a processor configured to:
   convert control logic included in the control application into control logic code expressed in a second programming language;
   express a type definition code in the second programming language and output the type definition code, the type definition code corresponding to a data block structure of data held by a function block included in the control application;
   express a memory allocation code in the second programming language and output the memory allocation code, the memory allocation code allocating an instance of the function block included in the control application to memory in the target hardware; and
   use at least one of a compiler or a linker for the target hardware to generate the executable code based on the control logic code, the type definition code, and the memory allocation code,
   wherein when generating the executable code, the processor is configured to use the compiler/linker to link a communication service program, a control service program, and a library that are precompiled for the target hardware,
   wherein the communication service program is configured to transmit and receive information to and from the engineering apparatus when the executable code is executed on the target hardware,
   wherein the control service program is configured to schedule execution of the executable code when the executable code is executed on the target hardware,
   wherein the processor is configured to transmit an ID of an instance of the function block to which data to be debugged belongs and an offset position from top address of the instance of the function block to the communication service program, and
   wherein the communication service program is configured to refer to data within the instance of the function block corresponding to the received ID of the instance of the function block.

2. The engineering apparatus of claim 1, wherein the processor is configured to select the compiler/linker for the target hardware from among a plurality of compiler/linkers.

3. The engineering apparatus of claim 1, wherein the processor is configured to extract member information and size information of the data block structure from the executable code.

4. The engineering apparatus of claim 3, further comprising:
   a memory configured to store the data block structure;
   wherein the processor is configured to provide the member information and the size information to the data block structure stored in the memory.

5. The engineering apparatus of claim 1, wherein a communication service with a loading function is implemented on the target hardware.

6. A control method of an engineering apparatus for generating executable code from a control application, created in a first programming language, for controlling target hardware, the executable code causing the target hardware to operate, the control method comprising:
   converting control logic included in the control application into control logic code expressed in a second programming language;
   expressing a type definition code in the second programming language and outputting the type definition code, the type definition code corresponding to a data block structure of data held by a function block included in the control application;
   expressing a memory allocation code in the second programming language and outputting the memory allocation code, the memory allocation code allocating an instance of the function block included in the control application to memory in the target hardware; and
   using at least one of a compiler or a linker for the target hardware to generate the executable code based on the control logic code, the type definition code, and the memory allocation code,
   wherein when generating the executable code, the control method further comprises using the compiler/linker to link a communication service program, a control service program, and a library that are precompiled for the target hardware,
   wherein the communication service program is configured to transmit and receive information to and from the engineering apparatus when the executable code is executed on the target hardware,
   wherein the control service program is configured to schedule execution of the executable code when the executable code is executed on the target hardware,
   wherein the control method further comprises transmitting an ID of an instance of the function block to which data to be debugged belongs and an offset position from top address of the instance of the function block to the communication service program, and
   wherein the communication service program is configured to refer to data within the instance of the function block corresponding to the received ID of the instance of the function block.

7. A non-transitory computer-readable storage medium with an executable program stored thereon, wherein the program controls an engineering apparatus for generating executable code from a control application, created in a first programming language, for controlling target hardware, the executable code causing the target hardware to operate, the program causing the engineering apparatus to:
   convert control logic included in the control application into control logic code expressed in a second programming language;
   express a type definition code in the second programming language and output the type definition code, the type definition code corresponding to a data block structure of data held by a function block included in the control application;
   express a memory allocation code in the second programming language and output the memory allocation code, the memory allocation code allocating an instance of the function block included in the control application to memory in the target hardware; and
   use at least one of a compiler or a linker for the target hardware to generate the executable code based on the control logic code, the type definition code, and the memory allocation code,
   wherein when generating the executable code, the program causes the engineering apparatus to use the compiler/linker to link a communication service program, a control service program, and a library that are precompiled for the target hardware,
   wherein the communication service program is configured to transmit and receive information to and from the engineering apparatus when the executable code is executed on the target hardware,
   wherein the control service program is configured to schedule execution of the executable code when the executable code is executed on the target hardware,
   wherein the program causes the engineering apparatus to transmit an ID of an instance of the function block to which data to be debugged belongs and an offset position from top address of the instance of the function block to the communication service program, and
   wherein the communication service program is configured to refer to data within the instance of the function block corresponding to the received ID of the instance of the function block.

* * * * *